United States Patent
An et al.

(10) Patent No.: US 7,520,563 B1
(45) Date of Patent: Apr. 21, 2009

(54) VEHICLE EQUIPPED WITH PASSENGER FRAME HAVING SMALL HEIGHT FROM GROUND

(75) Inventors: Yongdok An, Goyang-si (KR); Munsoo Cha, Seoul (KR); Jongboo Park, Hwaseong-si (KR); Hakyeol Bae, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/959,737

(22) Filed: Dec. 19, 2007

(30) Foreign Application Priority Data

Nov. 9, 2007 (KR) ..................... 10-2007-0114097

(51) Int. Cl.
*B62D 25/02* (2006.01)

(52) U.S. Cl. ............. 296/204; 296/193.05; 296/203.03; 296/209

(58) Field of Classification Search ................. 296/204, 296/209, 29, 193.07, 193.05, 187.08, 187.12, 296/203.03

See application file for complete search history.

(56) References Cited

U.S. PATENT DOCUMENTS

| | | | | |
|---|---|---|---|---|
| 4,986,597 A | * | 1/1991 | Clausen | 296/205 |
| 5,209,541 A | * | 5/1993 | Janotik | 296/29 |
| 5,213,386 A | * | 5/1993 | Janotik et al. | 296/29 |
| 5,338,080 A | * | 8/1994 | Janotik et al. | 296/29 |
| 5,352,011 A | * | 10/1994 | Kihara et al. | 296/203.03 |
| 5,567,005 A | * | 10/1996 | Kosuge et al. | 296/204 |
| 5,619,784 A | * | 4/1997 | Nishimoto et al. | 29/430 |
| 5,765,906 A | * | 6/1998 | Iwatsuki et al. | 296/203.03 |
| 5,921,618 A | * | 7/1999 | Mori et al. | 296/187.12 |
| 6,003,898 A | * | 12/1999 | Teply et al. | 280/785 |
| 6,022,070 A | * | 2/2000 | Ashina et al. | 296/205 |
| 6,568,747 B2 | * | 5/2003 | Kobayashi | 296/204 |
| 6,824,200 B2 | * | 11/2004 | Tomita | 296/187.08 |

FOREIGN PATENT DOCUMENTS

| | | |
|---|---|---|
| JP | 6-270845 | 9/1994 |
| JP | 8-282547 | 10/1996 |

\* cited by examiner

*Primary Examiner*—Glenn Dayoan
*Assistant Examiner*—Gregory Blankenship
(74) *Attorney, Agent, or Firm*—Morgan, Lewis & Bockius LLP

(57) ABSTRACT

According to a vehicle V equipped with a passenger frame having a small height from the ground level of an embodiment of the invention, the vehicle is equipped with a passenger frame F, to have a height (vehicle height) from the ground level smaller than a vehicle equipped with a common frame F' that is disposed at a distance from side sills S and side frames f of the passenger frame F of the structure are inserted in spaces formed under the side sills S that forms the sides of the bottom of vehicle V. Therefore, the length of the passenger frame F protruding to the ground level is reduced, which reduces the height (vehicle height) of vehicle V from the ground level that is determined by the passenger frame F.

7 Claims, 3 Drawing Sheets

VEHICLE EQUIPPED WITH PASSENGER FRAME HAVING SMALL HEIGHT FROM GROUND

CROSS-REFERENCE TO RELATED APPLICATIONS

The present application is based on, and claims priority from, Korean Application Serial Number 10-2007-0114097, filed on Nov. 9, 2007, the disclosure of which is hereby incorporated by reference herein in its entirety.

FIELD OF THE INVENTION

The present invention relates to a vehicle, particularly a vehicle equipped with a passenger frame having a small height from the ground level.

BACKGROUND OF THE INVENTION

In general, a vehicle is classified into a frame type vehicle and a monocoque type vehicle.

A frame type of vehicle is provided with a frame as a basic chassis and allows saving cost by expansion of modularization and ride performance by isolating vibration due to the frame and a bush of a car body, whereas a monocoque type of vehicle has a low floor, such that it is possible to reduce the height of the vehicle from the ground level, improve roll performance, and develop stylish vehicles.

By applying the characteristics of the frame type and monocoque type as described above to a vehicle, that is, when a frame is applied to a vehicle that is designed for the monocoque type, it is possible to simultaneously obtain the advantages of a frame type of vehicle and a monocoque type of vehicle as well.

However, when a frame is applied to a vehicle, the frame cannot be applied to the vehicle only by reducing the size to fit the vehicle. Similarly, members of a passenger frame are disposed under a floor, such as the above frame, such that the height from the ground level is increased. As a result, the increase in height from the ground level does not meet requirement for monocoque type vehicles.

Accordingly, a design that does not cause increase in height from the ground level due to the frame in a vehicle equipped with a passenger frame should be preferentially considered in order to improve comfort by reducing the height from the ground level, such as a monocoque type vehicle, and make the vehicle stylish.

The information disclosed in this Background of the Invention section is only for enhancement of understanding of the background level of the invention and should not be taken as an acknowledgement or any form of suggestion that this information forms the prior art that is already known to a person skilled in the art.

SUMMARY OF THE INVENTION

It is an object of the invention to design a stylish frame type vehicle that has a small height from the ground level, such as a monocoque type vehicle, and provides comfort, and to improve safety in steering by, even though the vehicle is equipped with a frame, inserting the frame in side sills in order to reduce the height of the frame type vehicle from the ground level such that the center of gravity is lowered.

Further, it is another object of the invention to increase rigidity of the side sills regardless of the frame by disposing the frame in the side sills of the vehicle in order to prevent decrease in rigidity.

Exemplary embodiments of the present invention provide a vehicle equipped with a passenger frame having a small height from the ground level, in which side frames at both sides of the passenger frame are disposed in spaces formed by side sills that are formed at both sides of the vehicle.

The space formed by the side sill is positioned higher than the center portion of a center floor panel and the side frames of the passenger frame that are disposed in the side sills are disposed higher than the center portion of the center floor panel.

The side sill includes a side sill assembly, a side sill outer reinforcement panel, and a side sill inner reinforcement panel. The side sill assembly includes a plurality of panels attached to each other at predetermined distances from each other to form the outside of the bottom of the vehicle. The side sill outer reinforcement panel is attached to form a first side sill closed space in the side sill assembly that is an empty space inside the side sill assembly. The side sill inner reinforcement panel is connected to the center floor panel at a predetermined distance from the side sill outer reinforcement panel.

The side sill outer reinforcement panel has a body-shaped portion that horizontally extends to the side sill assembly in consideration of a rectangular cross section of the side frame of the passenger frame and then declines and bends toward the side sill assembly.

The center floor panel has a center panel portion at the bottom of which both ends are connected to the inside of the side sills and that forms a second side sill closed space between the side sill outer reinforcement panel attached inside of the side sill and the side sill inner reinforcement panel.

The center floor panel has: fixed portions that are different in height at both ends of the center panel portion forming the bottom of the center floor panel and attached to the side sill outer reinforcement panels; an extending block portion that blocks the side sill inner reinforcement panel between the center panel portion and the fixed portion to form a second side sill closed space; and a front fixed portion that is declined and attached to a portion of the side sill inner reinforcement panel 3 that is attached to the center panel portion of the center floor panel.

According to an exemplary embodiment of the present invention, it is possible to reduce the height of a vehicle from the ground level by disposing a frame in side sills, such that it is possible to obtain advantages of a frame type vehicle and a monocoque type vehicle.

Further, it is possible to reduce the height from the ground level even though a frame is applied to a vehicle; therefore, it is possible to reduce a space occupied by a frame in a compact car of which the inside is important in terms of lay out.

The above features and advantages of the present invention will be apparent from or are set forth in more detail in the accompanying drawings, which are incorporated in and form a part of this specification, and the following Detailed Description of the present invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
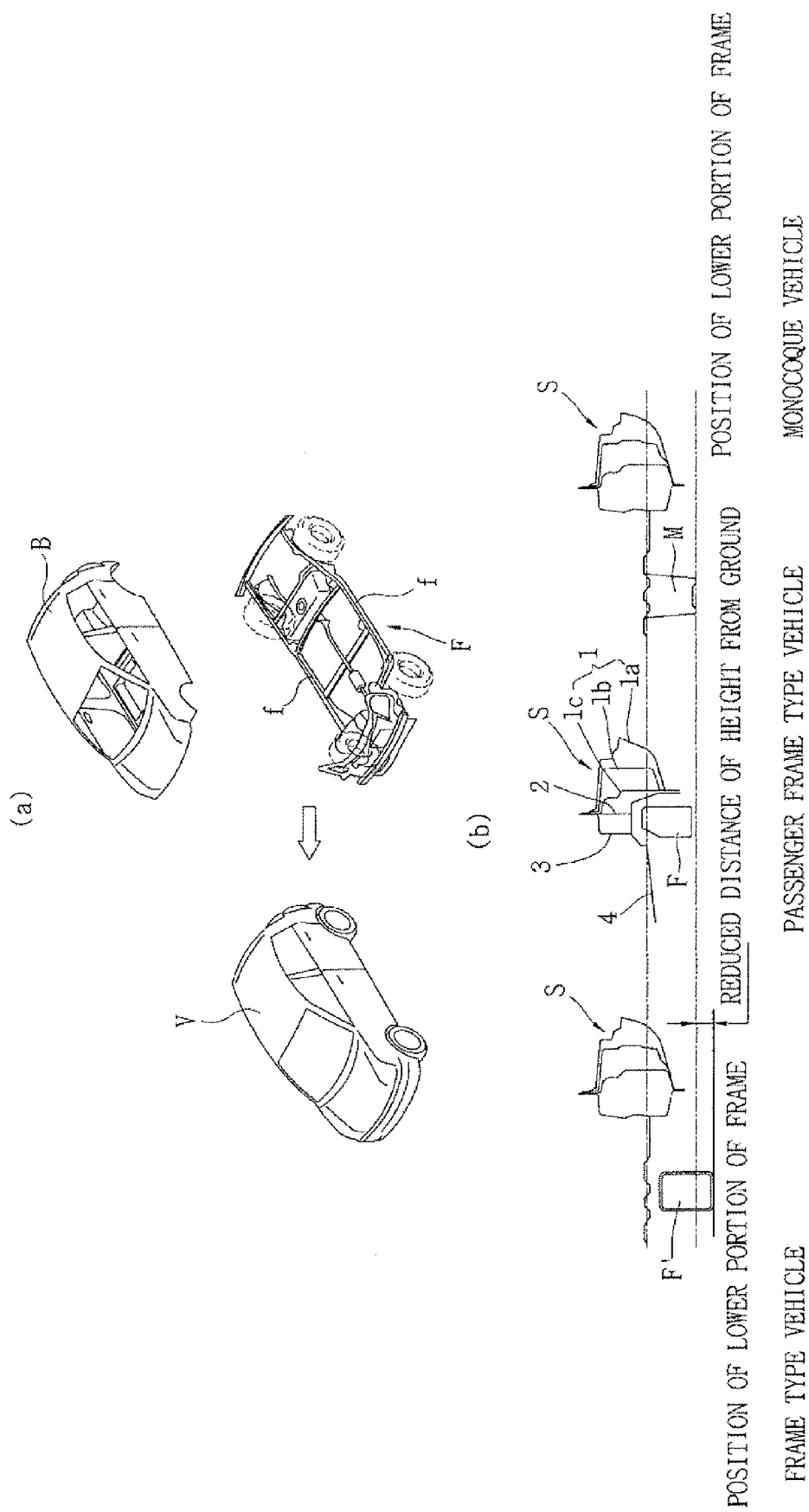
FIGS. 1A and 1B are views illustrating the configuration of a passenger frame and a vehicle that is equipped with the passenger frame according to an exemplary embodiment of the present invention.

It should be understood that the appended drawings are not necessarily to scale, presenting a somewhat simplified representation of various preferred features illustrative of the basic principles of the present invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1A illustrates assembly of a passenger frame with a passenger frame vehicle according to an exemplary embodiment of the present invention. In a vehicle V equipped with a passenger frame F of the structure according to an exemplary embodiment of the present invention, the upper portions of both side frames f are inserted in side sills S, such that the upper portions of side frames fare positioned higher than the bottom of the vehicle. Accordingly, the height of vehicle V from the ground level (vehicle height) is decreased and the appearance of the car body B is stylish.

In addition, since the height of vehicle V from the ground level (vehicle height) is decreased, the center of gravity is lowered and the safety of the vehicle in steering is correspondingly improved.

As shown in FIG. 1B, therefore, the height from the ground level of a vehicle equipped with a common frame F' that is spaced apart from side sill S is large, whereas vehicle V according to an exemplary embodiment of the present invention equipped with passenger frame F is decreased in height from the ground level, such as a monocoque type vehicle.

To achieve this configuration, according to an exemplary embodiment of the present invention, side frames f at both sides of passenger frame F are disposed inside side sills S at both sides of the bottom of vehicle V.

Figure 2:
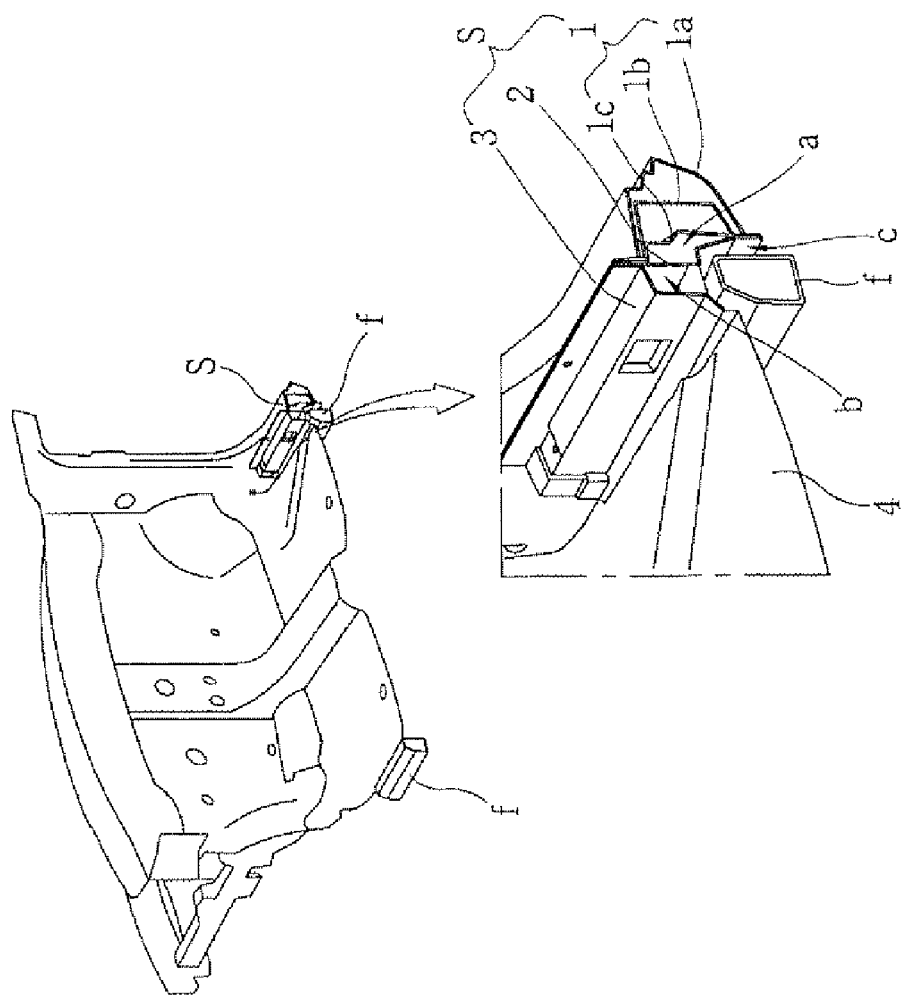
FIG. 2 is a detailed view of a vehicle equipped with a passenger frame having a small height from the ground level according to an exemplary embodiment of the present invention.

As shown in FIG. 2, that is, side frame f of passenger frame F is inserted in a frame member space c that is open and forms the lower space of side sill S, such that the length of passenger frame F protruding to the ground level is reduced and the height from the ground level determined by passenger frame F is reduced.

According to an exemplary embodiment of the present invention, frame member spaces c are formed under side sills S at both sides of a center floor panel 4 of vehicle V, reinforcement panels are additionally are provided to frame member spaces c to increase rigidity of side sills S, and then both side frames f of passenger frame F are disposed in frame member space c.

Therefore, side frames f of passenger frame F are positioned higher than the center portion of center floor panel 4 and inserted in side sills S, such that the protruding length to the ground level of passenger frame F mounted to vehicle V is reduced and center floor panel 4 is more lowered to the ground level.

Figure 3:
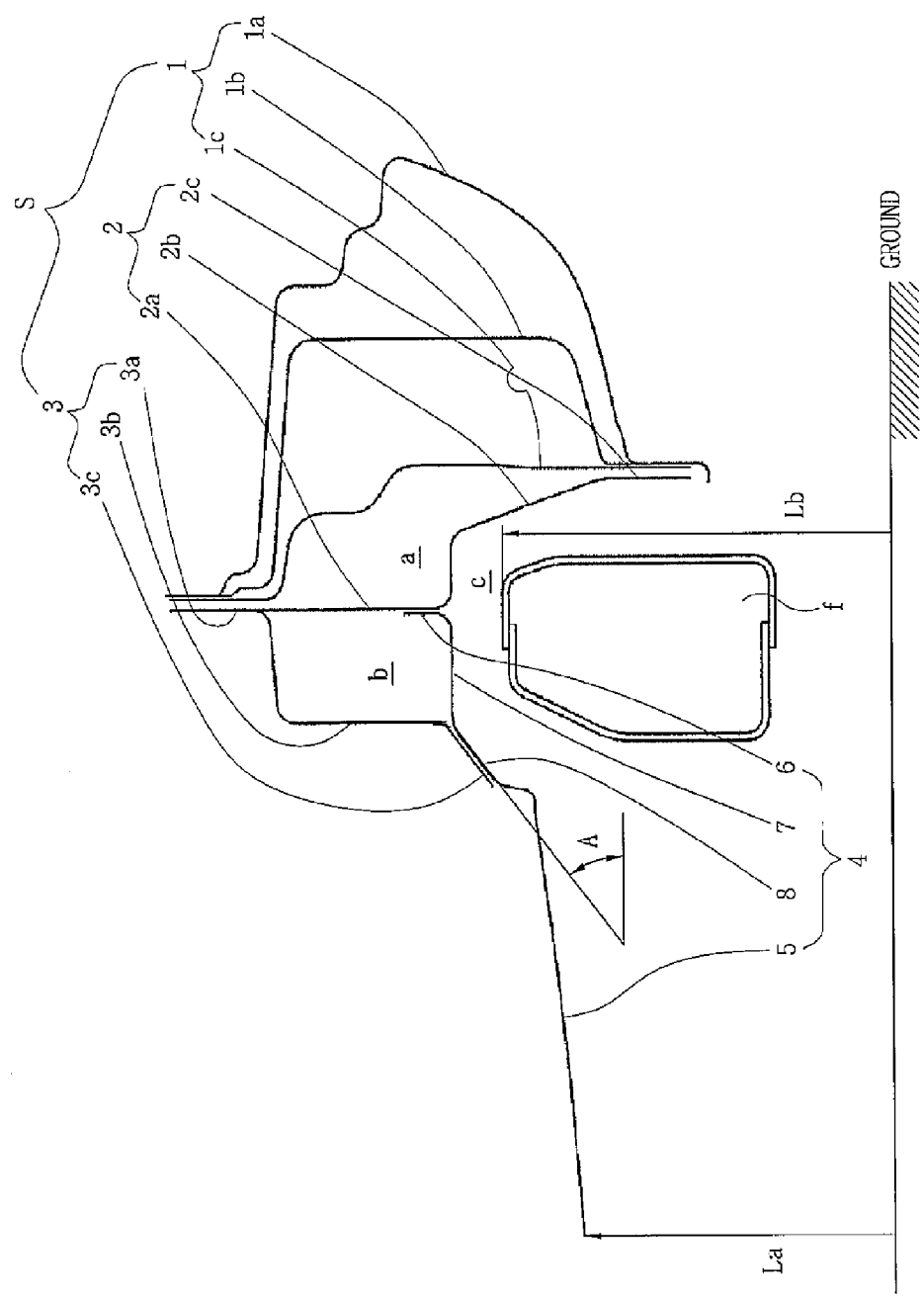
FIG. 3 is cross-sectional view illustrating the configuration of FIG. 2.

As shown in FIG. 3, side sill S is formed of a side sill assembly 1 including a plurality of panels that are attached to the outside of the bottom of vehicle V.

Further, a side sill outer reinforcement panel 2 is attached such that a first side sill closed space a is formed in side sill assembly 1.

Further, a side sill inner reinforcement panel 3 of which both ends are joined to center floor panel 4 is further provided at a predetermined distance from side sill outer reinforcement panel 2.

Side sill assembly 1 includes a side sill outer panel 1a that is disposed at the outermost, a side sill inner panel 1c that is attached to both lower and upper end portions of the side sill outer panel 1a and forms an inner space, and a side sill inner panel 1b that is positioned between the side sill outer panel 1a and the side sill inner panel 1c. The side sill inner panel 1b are attached to both lower and upper end portions of side sill outer panel 1a and the side sill inner panel 1c respectively while dividing the inner space between the side sill outer panel 1a and the side sill inner panel 1c into two parts.

Side sill outer reinforcement panel 2 and side sill inner reinforcement panel 3 increase the rigidity of side sill S that is reduced with decrease in cross-sectional area, that is, side sill outer reinforcement panel 2 and side sill inner reinforcement panel 3 support the side sill assembly 1 that is deformed by external impact applied to side sill S in a side collision in order to increase the rigidity.

Further, the upper portion 2a of the side sill outer reinforcement panel 2, which forms the first side sill closed space a, vertically extends down from an upper flange formed by the attached panels of side sill assembly 1.

Further, a body-shaped portion 2b extending from the lower end portion of upper portion 2a of side sill outer reinforcement panel 2 declines and has bent portions into side sill assembly 1.

In addition, a lower portion 2c extending from the lower end portion of the body-shaped portion 2b is connected to a lower flange formed by the attached panels of side sill assembly 1.

The bent portions of body-shaped portions 2b of side sill outer reinforcement panel 2 are formed in consideration of the width and shape of passenger frame F, that is, generally extends horizontally to the side sill assembly 1 and declines and bends to the lower portion of the side sill assembly 1 in consideration of the rectangular cross section of passenger frame F.

On the other hand, both ends of a center panel portion 5 that form the bottom of center floor panel 4 are connected into side sills S and a second side sill closed space b is formed between the upper portion 2a of the side sill outer reinforcement panel 2 attached inside the side sill S and the side sill inner reinforcement panel 3.

Fixed portions 6 of the center floor panel 4 that are different in height at both ends of center panel portion 5 forming the bottom of center floor panel 4 are attached to the side sill outer reinforcement panels 2.

Center floor panel 4 has an extending block portion 7 that blocks the side sill inner reinforcement panel 3 between the center panel portion 5 and fixed portion 6 to form second side sill closed space b.

Further, center floor panel 4 has a front fixed portion 8 that is declined downwards and attached to a portion of the side sill inner reinforcement panel 3 that is attached to center panel portion 5 of center floor panel 4.

The second side sill closed space b is closed by the extending block portion 7 that extends from center panel portion 5 of center floor panel 4 to the side sill outer reinforcement panel 2 and blocks the lower portion of the space.

In addition, the second side sill closed space b is formed by a body-shaped portion 3b that extends with a step from an upper portion 3a of the side sill inner reinforcement panel 3 attached to a portion of the upper portion 2a of side sill outer reinforcement panel 2.

Fixed portion 6 extending from the end of center panel portion 5 of center floor panel 4 is attached to upper end portion of body-shaped portion 2b of side sill outer reinforcement panel 2.

Further, lower portion 3c extending from a lower portion of the body-shaped portion 3b of the side sill inner reinforcement panel 3 to center floor panel 4 is attached to front fixed portion 8 that inclines with a step from center panel portion 5 of center floor panel 4.

The attached portions of side sill outer reinforcement panel 2, side sill inner reinforcement panel 3, and center floor panel 4 are welded.

Further, the lower portion 3c of side sill inner reinforcement panel 3 and the front fixed portion 8 of center floor panel 4 are welded at a welding angle A. The more the welding angle A increases, the less the passenger frame F occupies the inner space of the vehicle, in which, however, the welding is difficult, such that passenger frame F is disposed inside side sill S at a predetermined angle where the welding is possible.

Therefore, according to an exemplary embodiment of the present invention, first side sill closed space a is formed by side sill outer reinforcement panel 2 attached inside the side sill assembly 1 of side sill S.

Further, as second side sill closed space b is formed by side sill inner reinforcement panel 3 attached to side sill outer reinforcement panel 2 and front fixed portion 8 extending from center panel portion 5 of center floor panel 4, frame member space c that is open to the upper portion of side sill S at the lower portion of side sill S can be formed.

As described above, since the frame member space c of side sill S is positioned higher than the center panel portion 5 of center floor panel 4 forming the bottom inside the vehicle, when the upper portions of both side frames f of passenger frame F is disposed in frame member spaces c, the upper portion of passenger frame F is positioned higher than the center panel portion 5, such that the lower portion of side sill S is lowered to the ground level.

Therefore, the height from the ground level to the vehicle, that is, as shown in FIG. 3, a distance La that is the height of center panel portion 5 of center floor panel 4 from the ground level is smaller than a distance Lb that is the height of the upper portion of passenger frame F from the ground level.

As shown in FIG. 1B, when passenger frame F is inserted in side sill S, such as a monocoque type vehicle M, the vehicle according to an exemplary embodiment of the present invention has a height smaller than a vehicle equipped with a common frame F' of which the position is not affected by side sill S.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A vehicle equipped with a passenger frame having a small height from the ground level, wherein side frames at both sides of the passenger frame are disposed in spaces formed by side sills that are formed at both sides of the vehicle,
   wherein the passenger frame is configured to extend substantially a full length of a body of the vehicle and is positioned under the body, and wherein the side sills are formed in the body.

2. The vehicle as defined in claim 1, wherein an upper portion of the space formed by the side sill is positioned higher than a center portion of a center floor panel and upper portions of the side frames of the passenger frame that are disposed in the side sills are disposed higher than the center portion of the center floor panel.

3. The vehicle as defined in claim 2, wherein the side sill includes:
   a side sill assembly that includes a plurality of panels attached to each other at a predetermined distances from each other to form the outside of the bottom of the vehicle;
   a side sill outer reinforcement panel that is attached to form a first side sill closed space in the side sill assembly that is an empty space inside the side sill assembly; and
   a side sill inner reinforcement panel that is connected to the center floor panel at a predetermined distance from the side sill outer reinforcement panel.

4. The vehicle as defined in claim 3, wherein the side sill outer reinforcement panel has a body-shaped portion that horizontally extends from the end of an upper portion to the side sill assembly in consideration of a rectangular cross section of the side frame of the passenger frame and then declines and bends toward the side sill assembly.

5. The vehicle as defined in claim 2, wherein the center floor panel has a center panel portion at the bottom, of which both ends are connected to the inside of the side sills and that forms a second side sill closed space between the side sill outer reinforcement panel attached inside of the side sill and the side sill inner reinforcement panel.

6. The vehicle as defined in claim 5, the center floor panel has a front fixed portion that declines and forms a welding angle.

7. The vehicle as defined in claim 1, wherein a longitudinal length of the body is approximately equal to a longitudinal length of the passenger frame.

* * * * *